(12) United States Patent
Ichihashi et al.

(10) Patent No.: US 10,719,502 B2
(45) Date of Patent: Jul. 21, 2020

(54) INFORMATION PROCESSING APPARATUS AND CONTROL METHOD FOR INFORMATION PROCESSING APPARATUS

(71) Applicant: FUJITSU LIMITED, Kawasaki-shi, Kanagawa (JP)

(72) Inventors: Shigeru Ichihashi, Yokohama (JP); Norihiko Sakamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 15/906,198

(22) Filed: Feb. 27, 2018

(65) Prior Publication Data
US 2018/0260433 A1 Sep. 13, 2018

(30) Foreign Application Priority Data

Mar. 13, 2017 (JP) .................................. 2017-046907

(51) Int. Cl.
*G06F 16/23* (2019.01)
*G06F 8/30* (2018.01)
*G06F 9/455* (2018.01)

(52) U.S. Cl.
CPC ............ *G06F 16/2365* (2019.01); *G06F 8/30* (2013.01); *G06F 9/45558* (2013.01);
(Continued)

(58) Field of Classification Search
CPC .... G06F 16/2365; G06F 9/45558; G06F 8/30; G06F 9/45545; G06F 2009/45562; G06F 2221/034
(Continued)

(56) References Cited

U.S. PATENT DOCUMENTS

2011/0004676 A1   1/2011  Kawato
2011/0035802 A1   2/2011  Arajujo, Jr. et al.
(Continued)

FOREIGN PATENT DOCUMENTS

CN   104461693   3/2015
JP   2011-70627  4/2011
(Continued)

OTHER PUBLICATIONS

EESR—Extended European Search Report of European Patent Application No. 18158339.4 dated Jul. 2, 2018.
(Continued)

*Primary Examiner* — Michael Pham
(74) *Attorney, Agent, or Firm* — Fujitsu Patent Center (57) ABSTRACT

An information processing apparatus includes a memory and a processor. The memory is configured to store a parent template including a plurality of designation conditions applicable to at least one virtual machine. The plurality of designation conditions include first designation conditions and second designation conditions. The processor is configured to create a child template for creating a virtual machine image to operate on a virtual machine. The child template is based on the parent template and includes at least one designation condition. The processor is configured to compare the at least one designation condition of the child template to the plurality of designation conditions stored in the memory. The processor is configured to display a result of the comparison.

15 Claims, 10 Drawing Sheets

(52) U.S. Cl.
CPC ............... *G06F 9/45545* (2013.01); *G06F 2009/45562* (2013.01); *G06F 2221/034* (2013.01)

(58) Field of Classification Search
USPC ..................................................... 707/690
See application file for complete search history.

(56) References Cited

U.S. PATENT DOCUMENTS

| | | |
|---|---|---|
| 2011/0071983 A1 | 3/2011 | Murase |
| 2015/0067168 A1 | 3/2015 | Hegdal et al. |
| 2015/0178108 A1 | 6/2015 | Tarasuk-Levin et al. |
| 2016/0170788 A1* | 6/2016 | Tarasuk-Levin .... G06F 9/45558 718/1 |

FOREIGN PATENT DOCUMENTS

| | | |
|---|---|---|
| JP | 2015-46159 | 3/2015 |
| WO | 2009/098909 | 8/2009 |

OTHER PUBLICATIONS

EPOA—Office Action of European Patent Application No. 18158339.4 dated Jul. 23, 2019.
Result of consultation on cited Reference D3 of European Patent Application No. 18158339.4 dated Jul. 26, 2019.

* cited by examiner

| <NECESSARY PACKAGE> | | |
|---|---|---|
| PACKAGE NAME | VERSION NUMBER | ARCHITECTURE |
| bash | AFTER 4.1.0 | x86_64 |
| glibc | AFTER 2.12 | x86_64 |

| <UNNECESSARY PACKAGE> | | |
|---|---|---|
| PACKAGE NAME | VERSION NUMBER | ARCHITECTURE |
| filesystem | – | x86_64 |

<NECESSARY OS SETTING>

SETTING SUBSTANCE

AUTHENTICATION (ENCRYPTION KEY)

<UNNECESSARY OS SETTING>

SETTING SUBSTANCE

NETWORK IS CONFIGURED AUTOMATICALLY

| <NECESSARY DRIVER> | | |
|---|---|---|
| DRIVER NAME | VERSION NUMBER | ARCHITECTURE |
| virtio-win | AFTER 1.7.1 | x86_64 |

| <UNNECESSARY DRIVER> | | |
|---|---|---|
| DRIVER NAME | VERSION NUMBER | ARCHITECTURE |
| | | x86_64 |

FIG. 6

| | PACKAGE NAME | VERSION NUMBER | ARCHITECTURE |
|---|---|---|---|
| ☐ | bash | 4.1.2 | x86_64 |
| ☐ | bzip2 | 1.0.5 | x86_64 |
| ☐ | centos-release | 6 | x86_64 |
| ☐ | chkconfig | 1.3.49.3 | x86_64 |
| ☐ | dhclient | 4.1.1 | i686 |
| ☐ | filesystem | 5.6 | x86_64 |
| ☐ | gettext | 0.17 | i686 |
| ☐ | glibc | 2.12 | x86_64 |

FIG.7

| | |
|---:|:---|
| USER NAME | [____________] |
| USER ID | ☐ AUTOMATICALLY SET USER ID |
| SHELL | [____________] |
| HOME DIRECTORY | [____________] |
| PRIMARY GROUP | ☐ AUTOMATICALLY CREATE PRIMARY GROUP |
| SECONDARY GROUP | [____________] |
| PASSWORD | [____________] |
| CONFIRMATION OF PASSWORD | [____________] |
| ⋮ | |
| AUTHENTICATION METHOD | ☐ PERFORM AUTHENTICATION BY ENCRYPTION KEY |
| ⋮ | |
| NETWORK | ☐ AUTOMATICALLY SET NETWORK |
| ⋮ | |

FIG.8

| | PACKAGE NAME | VERSION NUMBER | ARCHITECTURE |
|---|---|---|---|
| ☑ | bash | 4.1.2 | x86_64 |
| ☐ | bzip2 | 1.0.5 | x86_64 |
| ☑ | centos-release | 6 | x86_64 |
| ☐ | chkconfig | 1.3.49.3 | x86_64 |
| ☐ | dhclient | 4.1.1 | i686 |
| ☐ | filesystem | 5.6 | x86_64 |
| ☐ | gettext | 0.17 | i686 |
| ☑ | glibc | 2.12 | x86_64 |

FIG. 9

| | |
|---:|:---|
| USER NAME | FJ_taro |
| USER ID | ☐ AUTOMATICALLY SET USER ID |
| SHELL | /bin/bash |
| HOME DIRECTORY | /home/FJ_taro |
| PRIMARY GROUP | ☑ AUTOMATICALLY CREATE PRIMARY GROUP |
| SECONDARY GROUP | grp1 |
| PASSWORD | ******* |
| CONFIRMATION OF PASSWORD | ****** |
| ⋮ | |
| AUTHENTICATION METHOD | ☑ PERFORM AUTHENTICATION BY ENCRYPTION KEY |
| ⋮ | |
| NETWORK | ☐ AUTOMATICALLY SET NETWORK |
| ⋮ | |

FIG.10

<COMPARISON RESULT>

| PACKAGE | PARENT | CHILD | MOVEMENT DESTINATION |
|---|---|---|---|
| filesystem | N | N | Y |
| glibc | Y | Y | N |

| OS SETTING | PARENT | CHILD | MOVEMENT DESTINATION |
|---|---|---|---|
| AUTHENTICATION (ENCRYPTION KEY) | Y | Y | N |
| AUTOMATIC SETTING OF NETWORK | N | N | Y |

| ADDITIONAL DRIVER | PARENT | CHILD | MOVEMENT DESTINATION |
|---|---|---|---|
| virtio-win | Y | Y | N |

INFORMATION PROCESSING APPARATUS AND CONTROL METHOD FOR INFORMATION PROCESSING APPARATUS

CROSS-REFERENCE TO RELATED APPLICATION

This application is based upon and claims the benefit of priority of the prior Japanese Patent Application No. 2017-046907, filed on Mar. 13, 2017, the entire contents of which are incorporated herein by reference.

FIELD

The embodiment discussed herein is related to an information processing apparatus, a control method for an information processing apparatus, and a program.

BACKGROUND

A service called virtual appliance (VA) is utilized in a situation in which an infrastructural environment of a service for providing a cloud or a virtual environment is diversified. Further, a virtual machine image that is applied to a virtual machine is created from a template of a VA. The template of the VA may be regarded also as metadata including a condition (designation condition) for each use environment of a virtual machine such as a package, operating system (OS) setting, or a driver. The metadata designates a virtual machine image executed in a virtual machine and an execution environment and an execution condition of a virtual machine image.

Although the substance of the VA differs for each use environment of the virtual machine, it is not realistic for a provider of a service to manually create a VA for each use environment. Therefore, a technology has been proposed which uses a template including the substance of the VA prepared in accordance with a service to support creation of a VA according to each use environment. Further, also a technology has been proposed which improves the efficiency in creation or distribution of a virtual machine image to be applied to creation of a VA or a virtual machine.

Related technologies are disclosed in, for example, International Publication Pamphlet No. WO 2009/098909, Japanese Laid-open Patent Publication No. 2011-070627, and Japanese Laid-open Patent Publication No. 2015-046159.

There is the possibility that selection of a driver to be included in a VA or the like may not be performed correctly in the absence of technical knowledge relating to hardware in a use environment of a virtual machine. Therefore, there is the possibility that, when the creator of the VA changes the substance of the VA in accordance with the use environment, the change may not match a dependency relationship with the different substance of the VA. As a result, there is the possibility that, even if a virtual machine image created from the VA is used on the virtual machine, the virtual machine may not operate correctly.

Also it is common to restrict the substance of a VA that may be changed to a creator of a VA upon creation of a VA. However, in this case, there is the possibility that the created VA may include the substance that is not recognized by the creator of the VA. Further, when the virtual machine does not operate correctly because of the substance of the VA that is not recognized by the creator of the VA, the problem is turned out at a stage at which a virtual machine image created from the VA is applied to a virtual machine. For example, it is difficult for the creator of the VA to recognize the problem upon creation of the VA.

SUMMARY

According to an aspect of the invention, provided is an information processing apparatus including a memory and a processor. The memory is configured to store a parent template including a plurality of designation conditions applicable to at least one virtual machine. The plurality of designation conditions include first designation conditions and second designation conditions. The processor is configured to create a child template for creating a virtual machine image to operate on a virtual machine. The child template is based on the parent template and includes at least one designation condition. The processor is configured to compare the at least one designation condition of the child template to the plurality of designation conditions stored in the memory. The processor is configured to display a result of the comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the following, an embodiment according to the technology of the present disclosure is described with reference to the drawings. It is to be noted that following detailed description is illustrative and does not limit the configuration of the embodiment.

Figure 1:
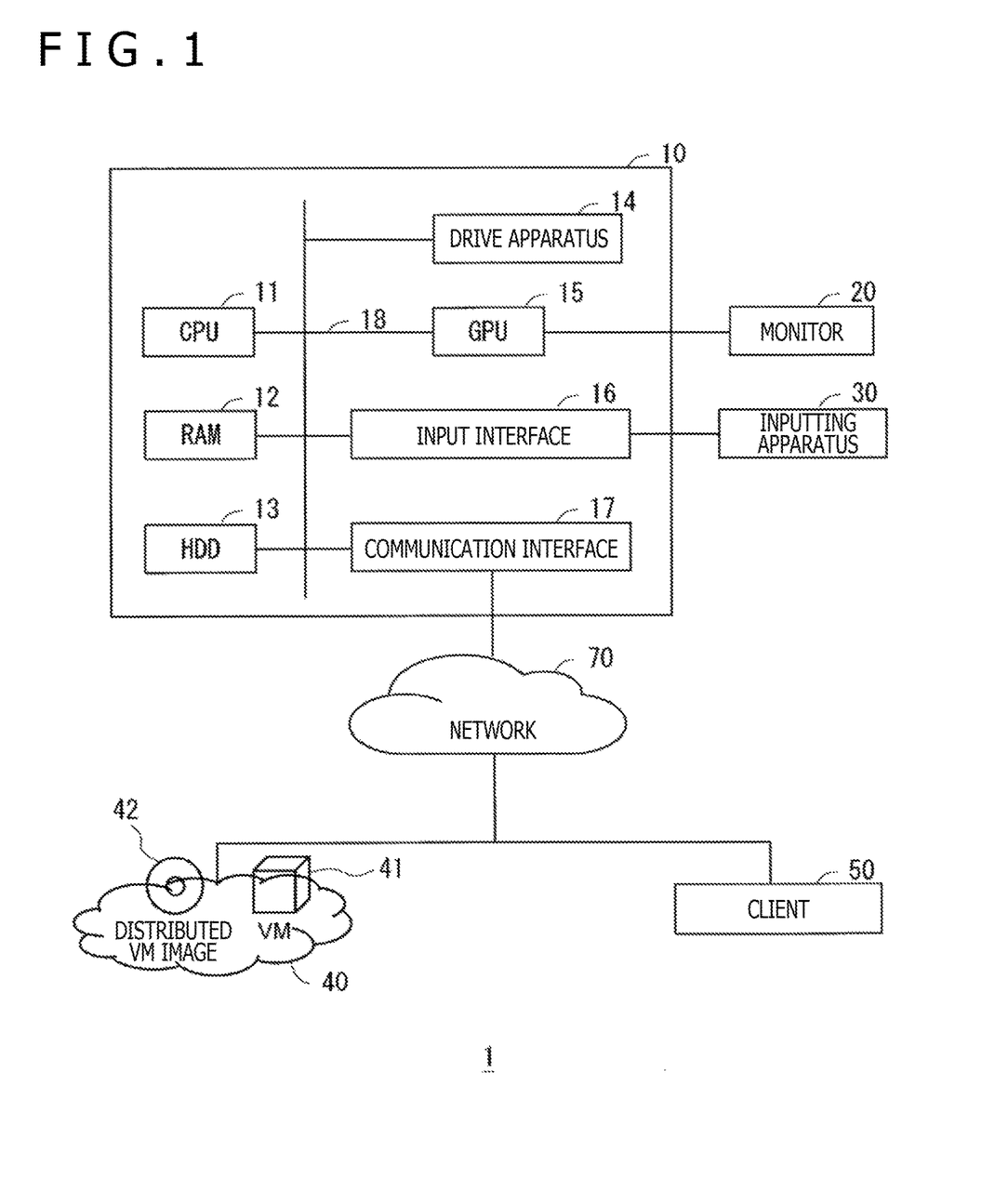
FIG. 1 is a block diagram depicting an example of a configuration of an information processing system according to an embodiment.

FIG. 1 depicts an example of a configuration of an information processing system according to an embodiment. An information processing system 1 includes a management server 10 that is an example of an information processing apparatus, a cloud 40, a client 50, and a network 70. The management server 10, the cloud 40, and the client 50 are coupled to each other through the network 70. The network 70 is a wired or wireless communication network. In the cloud 40, one or more virtual machines 41 operate. The management server 10 creates and distributes a virtual machine image 42 for causing the virtual machine 41 to operate to the virtual machine 41. Further, the number of such management servers 10, clouds 40, virtual machines 41, clients 50, and networks 70 is not limited to that depicted in FIG. 1.

As depicted in FIG. 1, the management server 10 includes a central processing unit (CPU) 11, a random access memory (RAM) 12, a hard disk drive (HDD) 13, a drive apparatus 14, a graphics processing unit (GPU) 15, an input interface 16, and a communication interface 17. Further, the GPU 15, the input interface 16, and the communication interface 17 are coupled to a monitor 20, an inputting apparatus 30, and the network 70, respectively. The CPU 11, the RAM 12, the HDD 13, the drive apparatus 14, the GPU 15, the input interface 16, and the communication interface 17 are coupled to each other through a bus 18. A user of the management server 10 who is a provider of a service of a virtual machine provided in the information processing system 1 issues various instructions of the management server 10 using the inputting apparatus 30 and confirms a result of processes of the management server 10 on the monitor 20. In the present embodiment, the CPU 11 deploys various programs stored in the HDD 13 into the RAM 12 and executes the programs to execute such various processes as described below.

Figure 2:
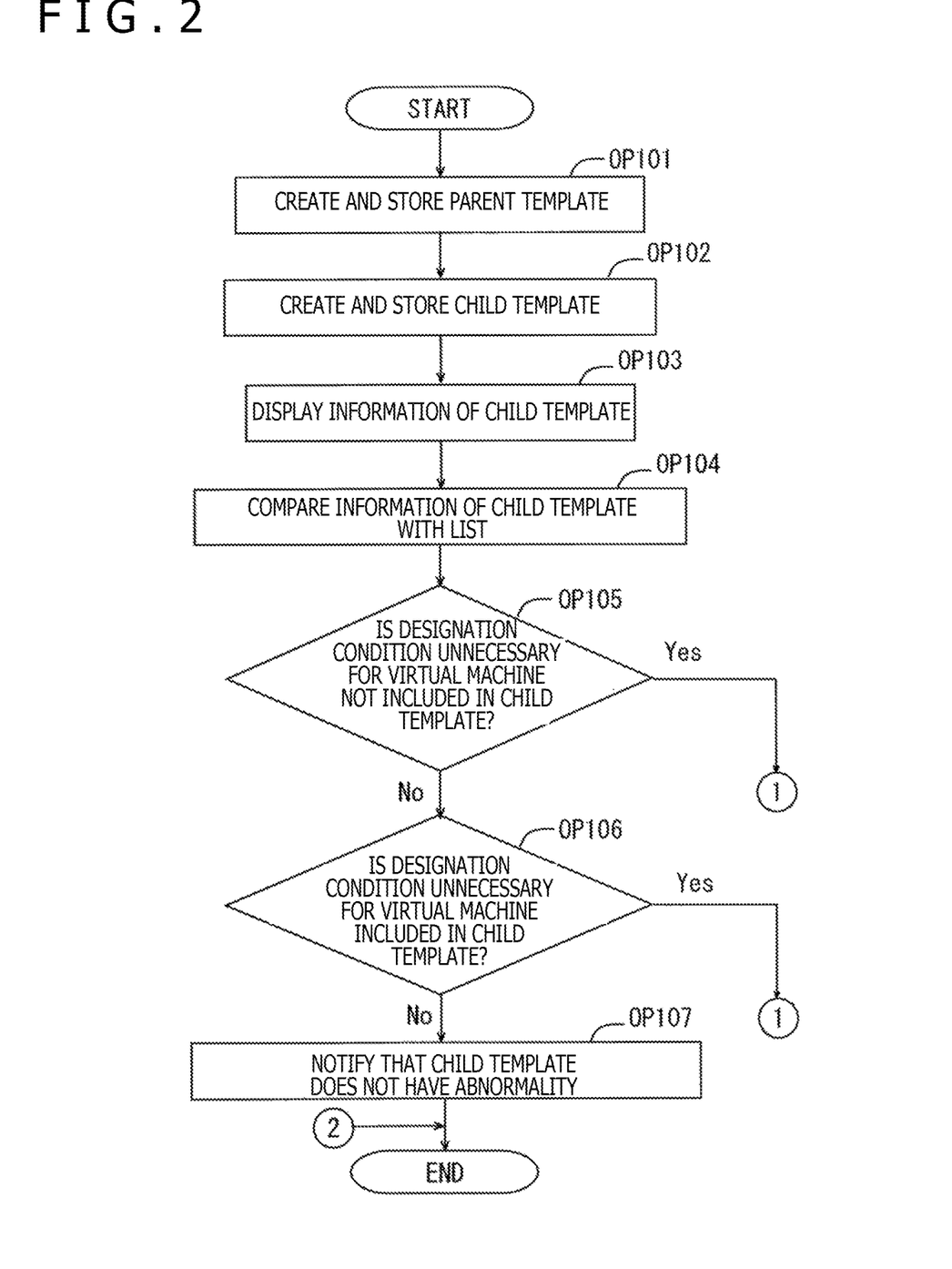
FIG. 2 is a flow chart of processes executed by a management server according to the embodiment.
Figure 3:
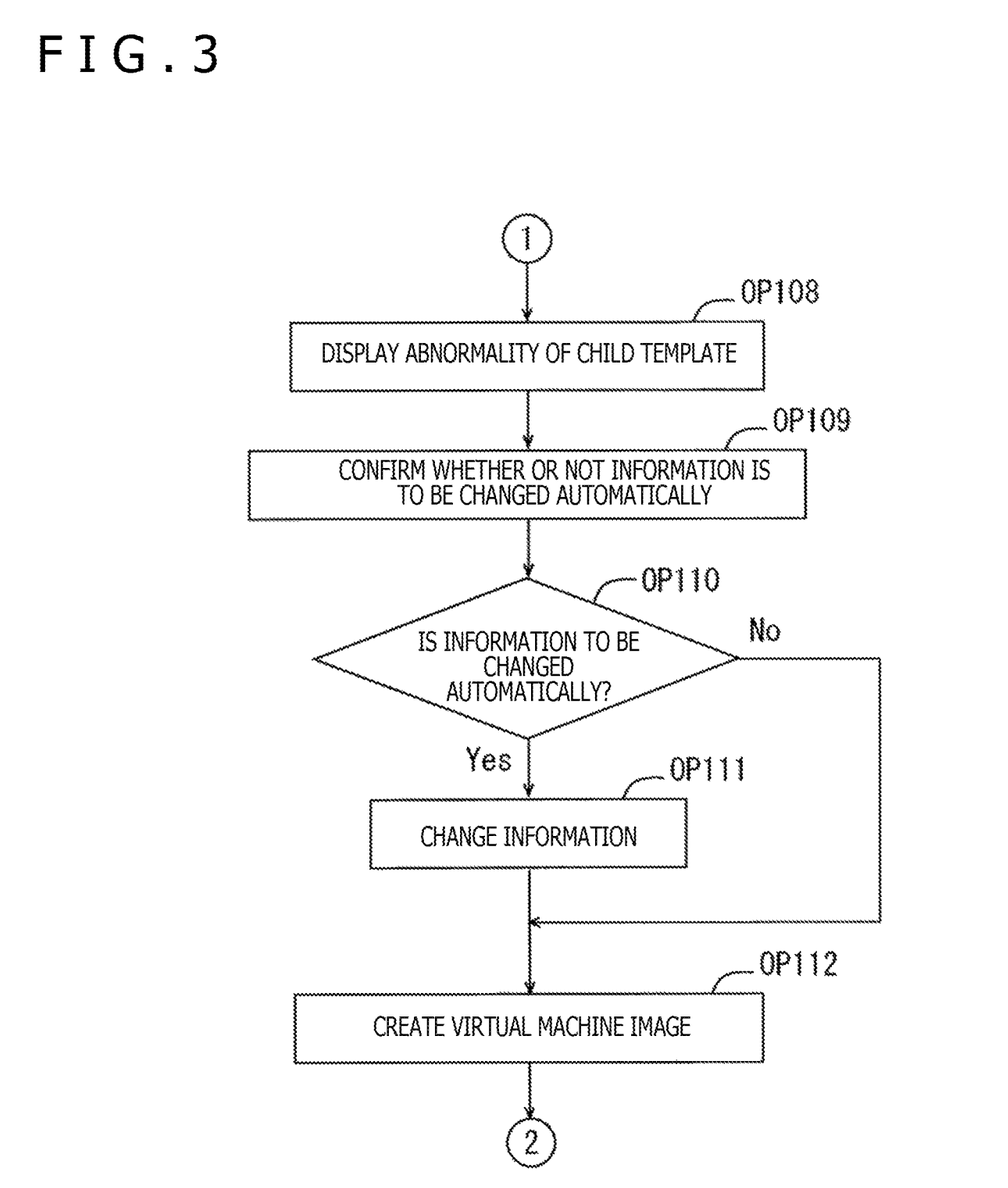
FIG. 3 is a flow chart of processes executed following the processes of FIG. 2 by a management server according to the embodiment.

In the following, processes executed by the management server 10 in the present embodiment are described with reference to flow charts. An example of a flow chart of processes executed by a CPU of a management server is illustrated in FIGS. 2 and 3. The management server and the CPU illustrated by reference to FIGS. 2 and 3 may be the management server 10 and the CPU 11 depicted in FIG. 1. Further, a flow of the processes depicted in FIGS. 2 and 3 is depicted schematically in FIG. 4. In the following description of the processes of FIGS. 2 and 3, the processes are described suitably with reference to FIG. 4. As an example, the CPU 11 of the management server 10 starts processes of the flow chart depicted in FIG. 2 when the user of the management server 10 operates the inputting apparatus 30 to input an instruction for creation of a virtual machine image to the management server 10. It is to be noted that the user of the management server 10 is a provider of the service and also a creator of a virtual machine image.

In the present embodiment, a database for storing a parent template hereinafter described is created in advance in the HDD 13 of the management server 10. Further, a database for storing a child template hereinafter described is created in advance for each child template in the HDD 13. Further, the entity of data corresponding to each designation condition included in the parent template and the child template is stored in a repository for collecting individual entities in the HDD 13.

Here, the parent template is metadata including conditions for a package, OS setting, a driver and so forth designated upon creation of a virtual machine image to be applied to a virtual machine in each service provided in the information processing system 1. It is to be noted that the condition just described is referred to as "designation condition" in the following description. Further, the child template is metadata including a designation condition used upon creation of a virtual machine image to be applied to a virtual machine in the information processing system 1. In the present embodiment, a child template is created using the designation condition included in the parent template.

Further, in the present embodiment, a vendor of the management server 10 creates a list of necessary designation conditions and unnecessary designation conditions for individual virtual machines used in the information processing system 1. For example, the vendor of the management server 10 specifies a necessary or unnecessary designation condition for causing each virtual machine to operate correctly based on experiences, knowledge, public information and so forth to create a list. It is to be noted that the list is an example of accumulation conditions in which conditions for causing a virtual machine image that is an example of a program to operate in a virtual machine are accumulated. Further, the list is an example of data individually accumulated for a virtual machine image.

Figure 5:
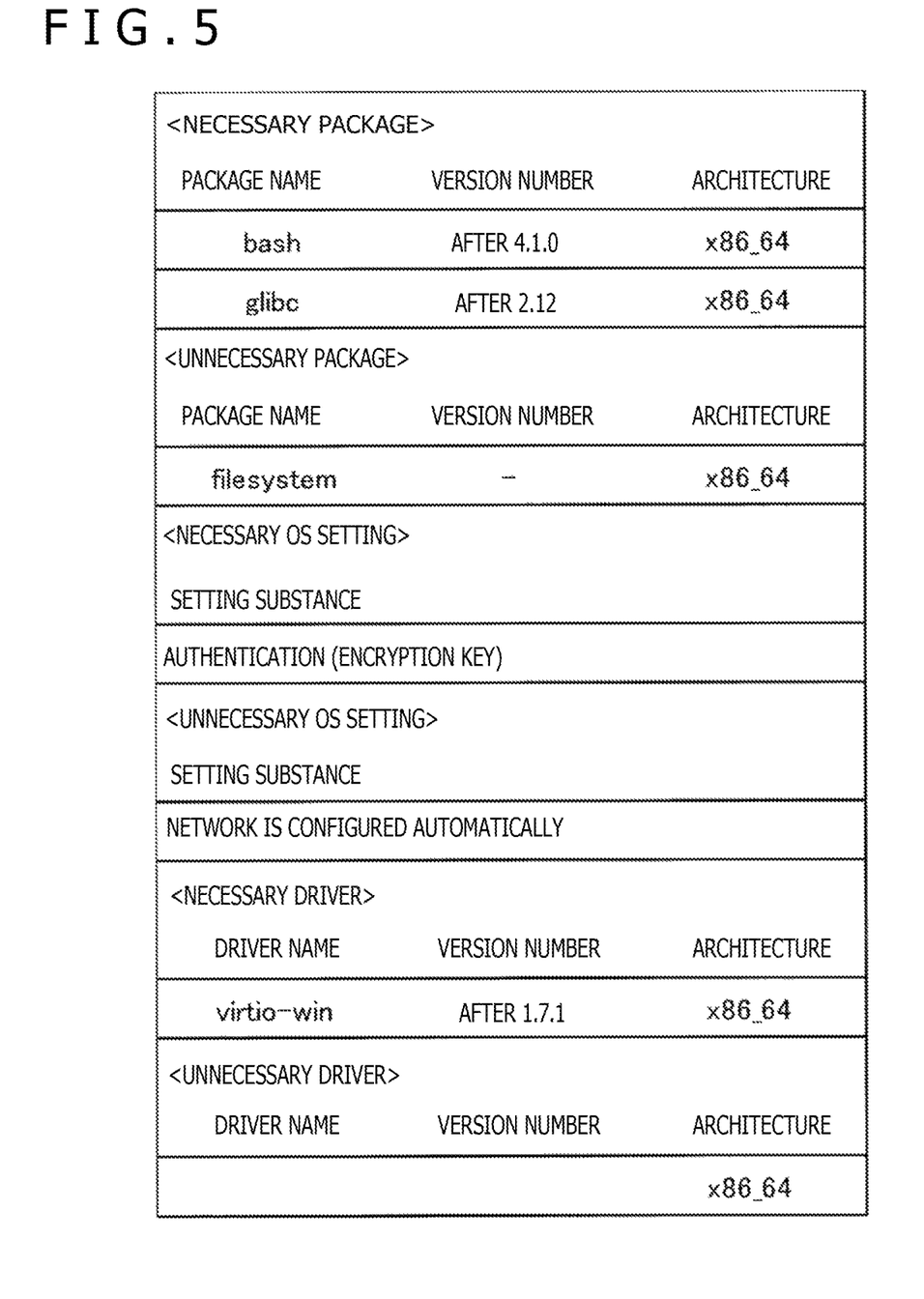
FIG. 5 is a view depicting an example of a list of designation conditions according to the embodiment.

An example of a list of necessary designation conditions and unnecessary designation conditions for a virtual machine image is depicted in FIG. 5. As depicted in FIG. 5, as an example, information relating to a necessary package and an unnecessary package for the virtual machine image, necessary OS setting, unnecessary OS setting, a necessary driver, and an unnecessary driver is stored in the list. In the list depicted in FIG. 5, in regard to the package and the driver, a condition relating to a version number, a condition for an architecture to be applied and so forth are included. It is to be noted that the configuration of the list or the type of information included in the list is not limited to that illustrated in FIG. 5 if a necessary or unnecessary designation condition for each virtual machine may be specified in a comparison process between a child template hereinafter described and the above-described list. It is to be noted that the list is stored in the database of a child template that is made a comparison target with the list in a process hereinafter described from among databases of the HDD 13 that is a storage unit.

In OP101, the CPU 11 creates a parent template in accordance with an instruction from the user of the management server 10. The process in OP101 is a process corresponding to "(1) create parent template" in FIG. 4. For example, the user of the management server 10 will operate the inputting apparatus 30 to designate a designation condition to be added to the parent template. The CPU 11 adds the designation condition designated by the user of the management server 10 to the parent template. If creation of a parent template is completed, the CPU 11 stores the created parent template into the HDD 13 and then advances the process to OP102.

Figure 6:
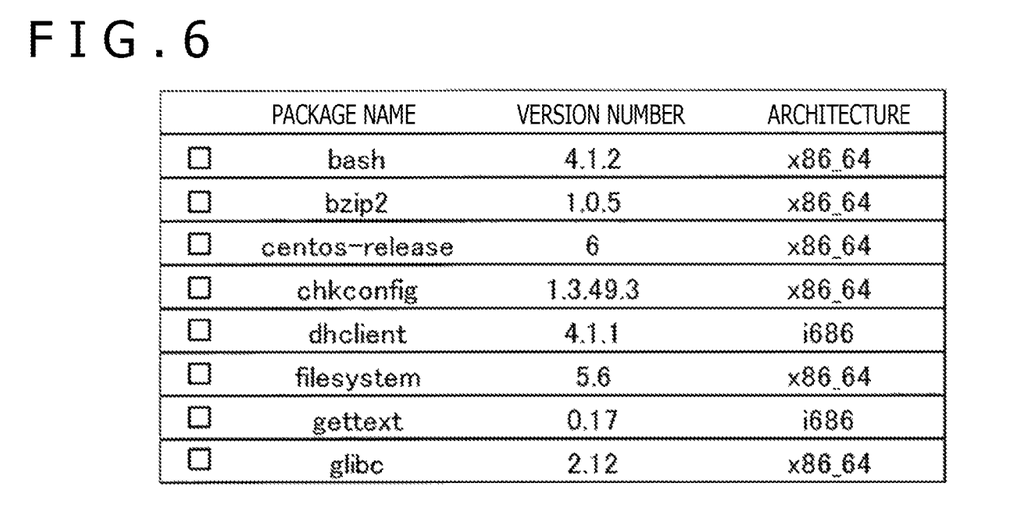
FIG. 6 is a view depicting an example of designation conditions of a package of a parent template according to the embodiment.
Figure 7:
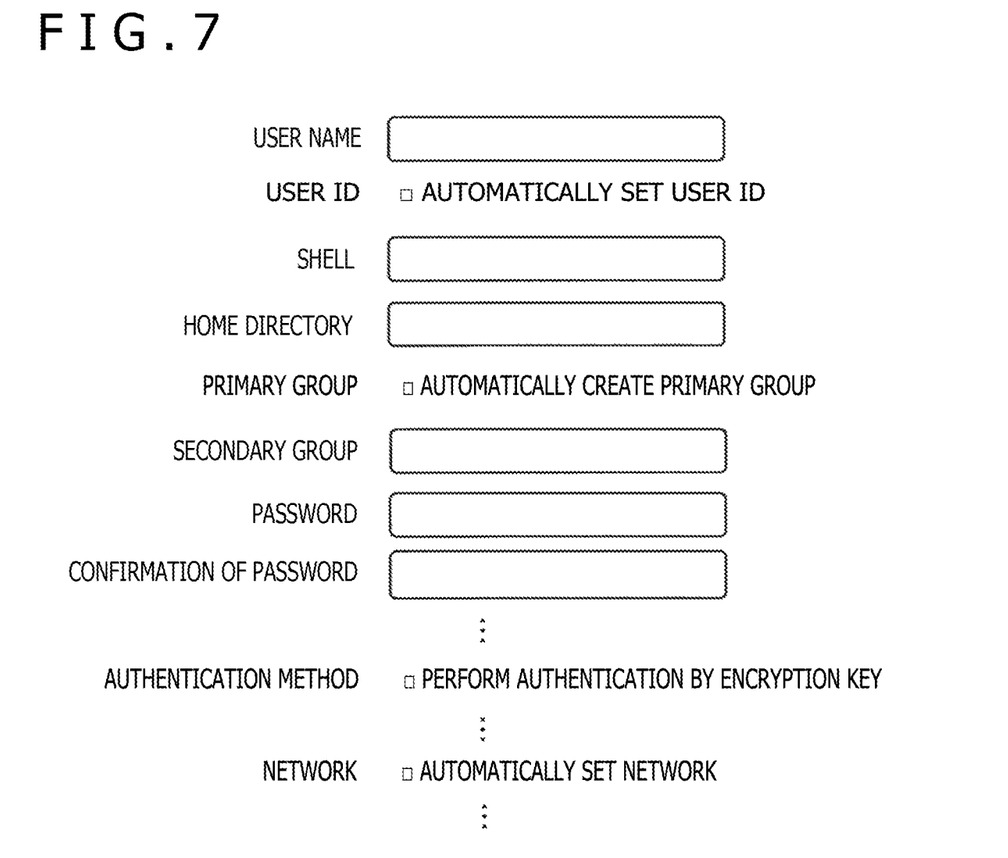
FIG. 7 is a view depicting an example of designation conditions of OS setting of a parent template according to the embodiment.

An example of designation conditions included in a parent template is depicted in FIGS. 6 and 7. An example of information of a package included in the parent template is depicted in FIG. 6. An example of information of OS setting included in the parent template is depicted in FIG. 7. As depicted in FIG. 6, as an example, a package name to be used in a service provided in the information processing system 1, a version number, and an architecture to which the package is applied are stored in the parent template. Further, a check box indicating whether or not the package is to be added to the virtual machine image is provided in the parent template.

Further, as an example, OS setting executed by the virtual machine is included in the parent template as depicted in FIG. 7. A user name, a storage place of a shell for an OS, a place of a home directory, necessity or non-necessity for automatic creation of a primary/secondary group, an authentication method upon use of the virtual machine, necessity or non-necessity for automatic setting of a network and so forth are included in the OS setting.

In OP102, in accordance with an instruction from the user of the management server 10, the CPU 11 creates a child template that is a VA to be used for creation of the virtual machine image from the parent template created in OP101. The process in OP102 is a process corresponding to "(2) create child template" in FIG. 4. The CPU 11 determines information to be added to the virtual machine image and information that is not to be added to the virtual machine image based on the substance of the child template.

The user of the management server 10 will operate the inputting apparatus 30 to designate a use environment for the virtual machine to which the virtual machine image is to be applied. Here, as an example of the use environment, there is a type of a service provided in the information processing system 1 (K5, Amazon Web Services (AWS), VMware (registered trademark) and so forth). As an example of the use environment, a type of a hypervisor to be used in the virtual machine (ESXi (registered trademark), Hyper-V (registered trademark), Xen (registered trademark) or the like) may be adopted.

The CPU 11 acquires information of the necessary designation condition and the unnecessary designation condition for the virtual machine image from the parent template in accordance with the use environment of the virtual machine designated by the user of the management server 10, and creates a child template from the acquired information of the designation conditions. The CPU 11 stores the created child template into a database for the child template of the HDD 13. Then, the process advances to OP103.

Figure 8:
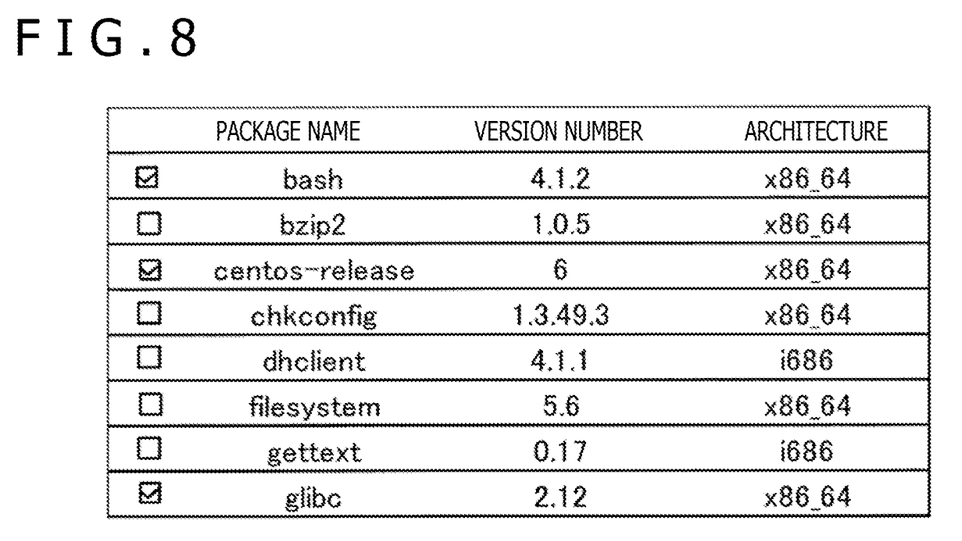
FIG. 8 is a view depicting an example of designation conditions of a package of a child template according to the embodiment.
Figure 9:
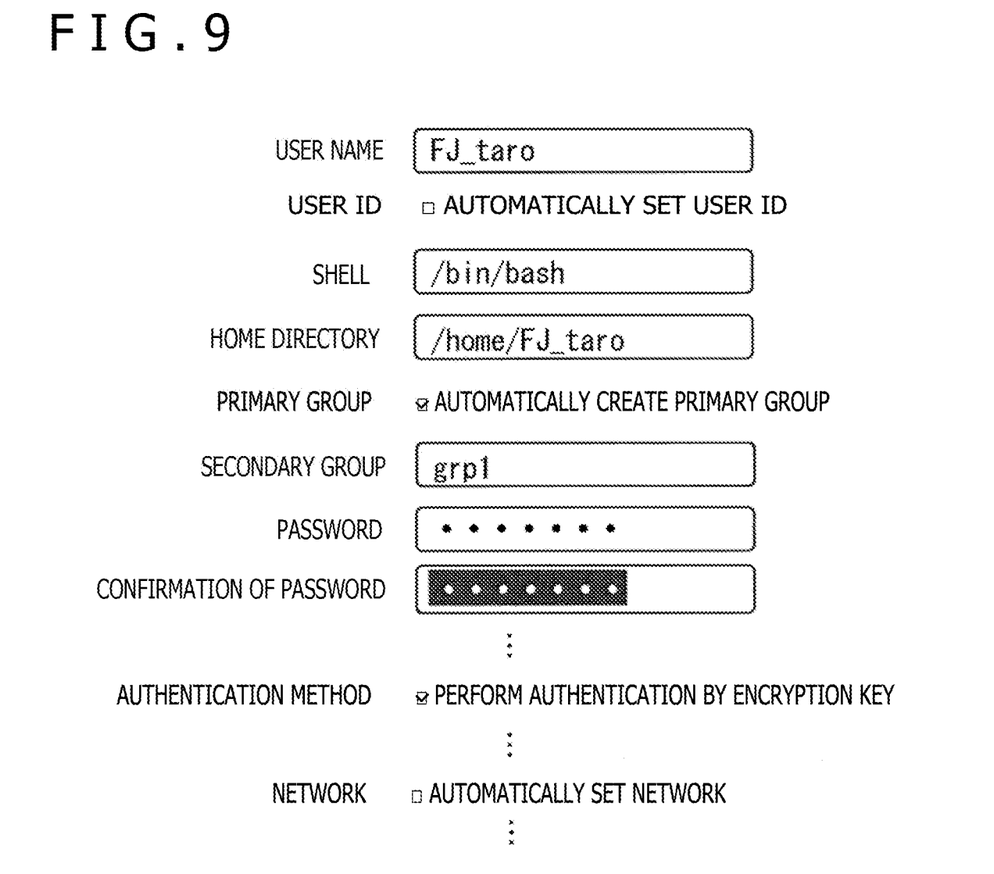
FIG. 9 is a view depicting an example of designation conditions of OS setting of a child template according to the embodiment.

An example of designation conditions included in a child template is depicted in FIGS. 8 and 9. An example of information of a package included in the child template is depicted in FIG. 8. Further, an example of information of OS setting included in the child template is depicted in FIG. 9. As an example, in the substance of the child template created in OP103, information used upon creation of a virtual machine image is added to the parent template depicted in FIGS. 8 and 9. For example, the CPU 11 adds information to the designation condition in the parent template or performs validation or invalidation of setting in response to the use environment designated by the user of the management server 10 in OP102.

In the example of the child template depicted in FIG. 8, packages "bash," "centos-release," and "glibc" are added to the virtual machine image. Then, the CPU 11 switches on a checkbox of the package based on the parent template. It is to be noted that, since the other packages depicted in FIG. 8 are not added to the virtual machine image, the CPU 11 switches off the checkboxes of the other packages.

Meanwhile, in the example of the child template depicted in FIG. 9, a user name, a storage place of a shell, a place of a home directory, a secondary group name, and a password are added to the virtual machine image. Here, it is assumed that, in the virtual machine, a user identification (ID) is automatically set and a primary group is automatically created and then authentication by an encryption key is performed. Therefore, the CPU 11 adds the information depicted in FIG. 9 and switches on the checkboxes based on the parent template. It is to be noted that, since, in the example depicted in FIG. 9, setting of a network in the virtual machine is performed manually by the user, the CPU 11 switches off the corresponding checkbox. After the CPU 11 sets the designation conditions to the child template as described above to create a child template, the CPU 11 advances the process to OP103.

In OP103, the CPU 11 outputs the information included in the child template created in OP102 to the monitor 20 through the GPU 15. The monitor 20 displays the information of the child template output from the management server 10 thereon. The process in OP103 is a process corresponding to "(3) display information of child template" of FIG. 4. For example, the information of the child template is displayed on the monitor 20 as depicted in FIGS. 8 and 9. A displaying method for the substance of the child template may be determined suitably if it is a displaying method by which the user of the management server 10 may confirm information added to the child template or a state of validation or invalidation of setting. Then, the process advances to OP104.

In OP104, the CPU 11 functions as a comparison unit and compares the information of the child template created in OP103 and information of the list stored in the HDD 13. The process in OP104 is a process corresponding to "(4) compare child template with list" of FIG. 4. For example, the CPU 11 performs comparison with the information of the list in regard to presence or absence of information or validation or invalidation of setting in each designation condition of the child template. The CPU 11 specifies a designation condition different from that in the list from among the designation conditions of the child template and stores the specified designation condition into the HDD 13.

For example, where the storage place for a shell is designated in the child template, the CPU 11 decides whether or not designation of a storage place for a shell is required in the list. Then, if designation of a storage place for a shell is required also in the list, the CPU 11 decides that the designation condition in the child template and the designation condition in the list coincide with each other. On the other hand, if designation of a storage place for a shell is not required in the list, the CPU 11 decides that the designation condition in the child template and the designation condition in the list are different from each other. Further, for example, if the designation condition that a network is to be automatically set is invalid in the child template, the CPU 11 decides whether or not it is required for the designation condition to be valid in the list. Then, if the designation condition that the network is to be automatically set is invalid also in the list, the CPU 11 decides that the designation condition in the child template and the designation condition in the list coincide with each other. On the other hand, if it is required for the designation condition that the network is to be automatically set to be valid in the list, the CPU 11 decides that the designation condition in the child template and the designation condition in the list are different from each other.

In this manner, by comparing the substance of each designation condition of the child template with the substance of the designation condition in the list with each other, the CPU 11 may decide whether or not the designation condition included in the child template is required by the virtual machine to which a virtual machine image created from the child template is applied. Further, the CPU 11 may specify, depending the decision, a designation condition different between the child template and the list.

In OP104, in regard to any designation condition different in the substance from the designation condition in the list from among the designation conditions of the child template, the CPU 11 stores also the information indicating whether the designation condition is a required designation condition or a non-required designation condition for the child template into the HDD 13. Then, the CPU 11 advances the process to OP105.

In OP105, the CPU 11 decides, based on the comparison in OP104, whether or not there exists a designation condition that is included in the required designation conditions in the list but is set as a non-required designation condition in the child template. If there exists a designation condition that is included in the required designation conditions in the list but is set as a non-required designation condition in the child template (OP105: Yes), the CPU 11 advances the process to OP108. On the other hand, if there does not exist a designation condition that is included in the required designation conditions in the list but is set as a non-required designation condition in the child template (OP105: No), the CPU 11 advances the process to OP106.

In OP106, the CPU 11 decides, based on the comparison in OP104, whether or not there exists a designation condition that is included in the non-required designation conditions in the list but is set as a required designation condition in the child template. If there exists a designation condition included in the non-required designation conditions in the list but is determined as a required designation condition in the child template (OP106: Yes), the CPU 11 advances the process to OP108. On the other hand, if there does not exist a designation condition that is included in the non-required designation conditions in the list but is set as a required designation condition in the child template (OP106: No), the CPU 11 advances the process to OP107.

In OP107, the CPU 11 regards from results of the decisions in OP105 and OP106 that the required designation condition in the list is a required designation condition also in the child template and that the non-required designation condition in the list is a non-required designation condition also in the child template. As a result, the CPU 11 issues a notification that there is no abnormality in the substance of the designation conditions of the child template to the management server 10. For example, the CPU 11 outputs a message for notification that there is no abnormality in the substance of the designation conditions of the child template to the monitor 20 through the GPU 15 such that the message is displayed on the monitor 20.

In OP108, the CPU 11 issues a notification of an abnormality of the substance of the designation condition of the child template to the manager of the management server 10 based on the decision process in OP105 or the decision processes in OP105 and OP106. The process in OP108 is a process corresponding to "(5) display abnormality of child template" of FIG. 4. Here, that the substance of the designation condition of the child template is abnormal is that a designation condition that is required in the child template is a designation condition not required in the list or that a designation condition that is not required in the child template is a designation condition required in the list. For example, the CPU 11 outputs, from among the required or non-required designation conditions of the child template, any designation condition that is not included in the required or non-required designation conditions in the list to the monitor 20 through the GPU 15 such that the information is displayed on the monitor 20.

Figure 10:
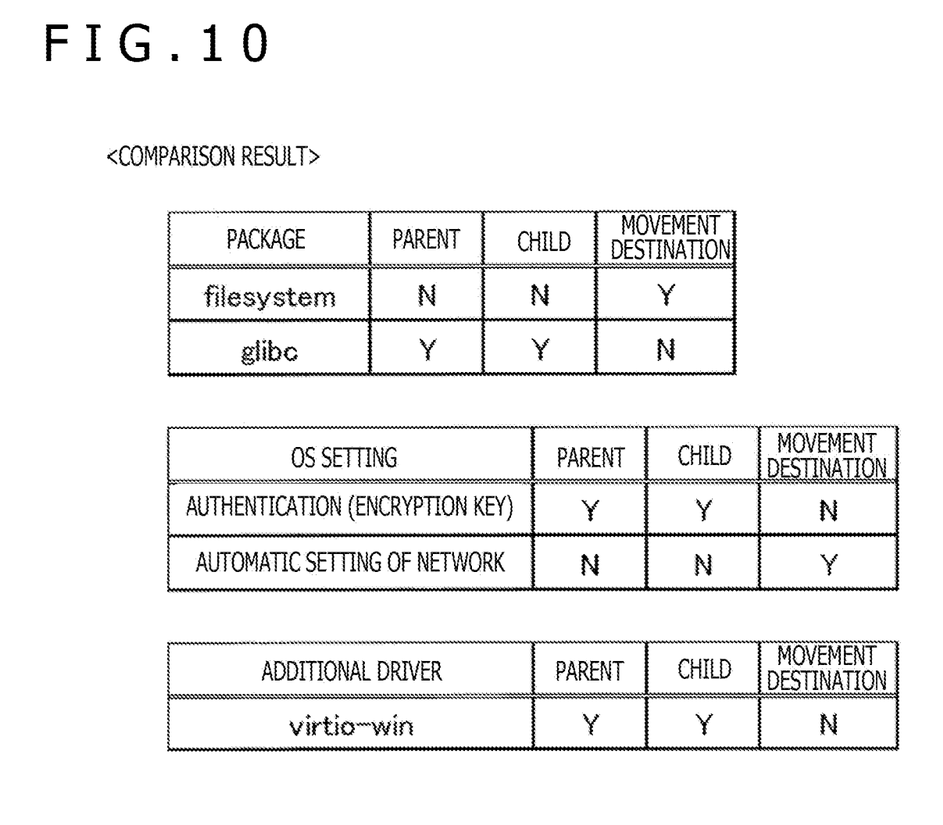
FIG. 10 is a view depicting an example of a result of comparison of designation conditions between a child template and a list according to the embodiment.

An example of information of designation conditions output from the CPU 11 in OP108 is depicted in FIG. 10. The information of designation conditions output from the CPU 11 in OP108 indicates whether each designation condition is a required designation condition or a non-required designation condition in each the parent template, child template, and virtual machine. It is to be noted that, in FIG. 10, "Y" signifies that the designation condition is required and "N" signifies that the designation condition is not required. Further, "parent," "child," and "movement destination" signify a parent template, a child template, and a virtual machine to which a virtual machine image created from the child template is to be applied, respectively.

In the case of the example of FIG. 10, the package "filesystem" indicates a designation condition that is not required for the virtual machine in the parent template and the child template. However, the package is a required designation condition in the virtual machine in order to access a file system in the virtual machine. On the other hand, the package "glibc" is a designation condition required for the virtual machine in the parent template and the child template. However, since a standard library of the C language provided by the package is not used in the virtual machine, the standard library is a non-required designation condition.

Further, OS setting "authentication (encryption key)" is a required designation condition for the virtual machine in the parent template and the child template. However, since such authentication by an encryption key that the user manually inputs a password to perform login is not executed in the virtual machine, the OS setting "authentication (encryption key)" is a non-required designation condition in the virtual machine. On the other hand, the OS setting "automatic setting of network" is a non-required designation condition in the parent template and the child template. However, since automatic setting of a network is performed in the virtual machine, the OS setting "automatic setting of network" is a required designation condition in the virtual machine.

Further, an additional driver "virtio-win" is a required designation condition for the virtual machine in the parent template and the child template. However, since a driver for a virtual input/output (I/O) is prepared, for example, at the virtual machine side and may not be included in the virtual machine image, the driver is a non-required designation condition in the virtual machine.

In this manner, in the present embodiment, information regarding necessity or non-necessity of designation conditions included in the child template referred to upon creation of the virtual machine image is compared with the list indicating necessity or non-necessity of designation conditions of the virtual machine. As a result, the user of the management server 10 may confirm that a designation condition required by the child template is not required by the virtual machine or a non-required designation condition by the child template is required by the virtual machine before execution of the virtual machine image in the virtual machine.

In OP109, the CPU 11 confirms whether or not the designation condition whose notification is received in OP108 is to be changed automatically. For example, the CPU 11 displays a dialog for determining whether or not a designation condition of the child template is to be automatically changed on the monitor 20 through the GPU 15. The manager of the management server 10 will confirm and operate the dialog displayed on the monitor 20 to determine whether or not a designation condition of the child template is to be automatically changed.

Then, in OP110, the CPU 11 decides whether or not the child template is to be automatically changed based on the operation of the manager of the management server 10 for the dialog displayed on the monitor 20 in OP109. If the child template is to be automatically changed (OP110: Yes), the CPU 11 advances the process to OP111. On the other hand, if the child template is not to be changed automatically (OP110: No), the CPU 11 advances the process to OP112.

In OP111, the CPU 11 changes, from among the designation conditions of the child template, a designation condition different from that of the list whose notification is received to the user of the management server 10 in OP108 in accordance with the designation conditions of the list. For example, where a package is a required package in the child template but is not a required packet in the list, the CPU 11 switches off the checkbox of the package in the child template. Further, where a driver is designated as an additional driver in the child template but is not a required driver in the list, the CPU 11 changes the information of the child template such that the driver is not added to the virtual machine image. If the change of the designation condition of the child template is completed, the CPU 11 advances the process to OP112.

Figure 4:
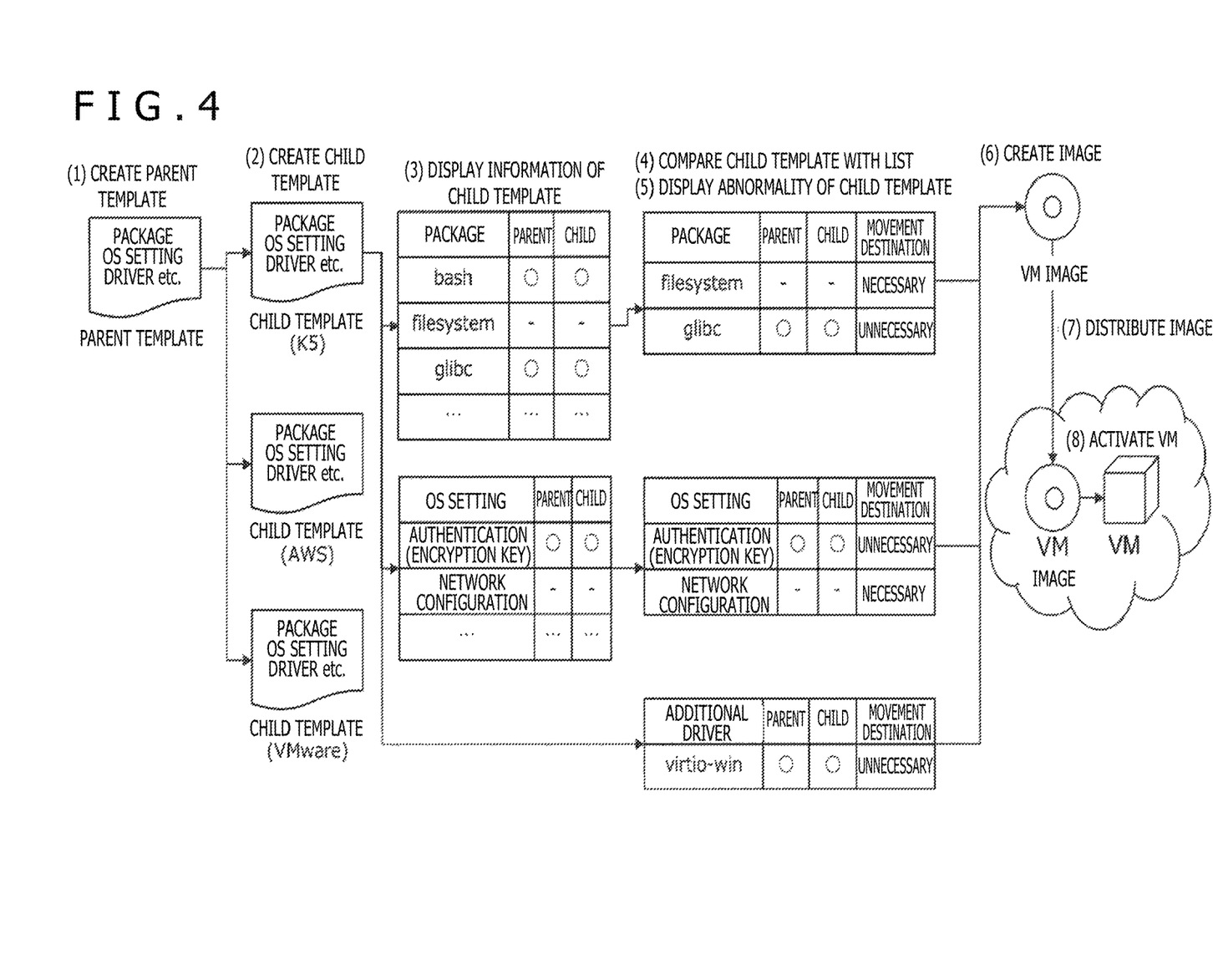
FIG. 4 is a view depicting an example of a flow of processes in an information processing system according to the embodiment.

In OP112, the CPU 11 functions as a creation unit and creates a virtual machine image in accordance with the designation condition of the child template (corresponding to "(6) Create image" of FIG. 4). After a virtual machine image is created, the CPU 11 ends the process of the present flow chart.

The virtual machine image created by the process described above is distributed and applied to the virtual machine (corresponding to "(7) distribute image" of FIG. 4), and the virtual machine is activated (corresponding to "(8) activate VM" of FIG. 4). Accordingly, in the present embodiment, before the virtual machine image is executed in the virtual machine, the user of the management server 10 may confirm whether information added to the virtual machine image and information not added to the virtual machine image are included suitably as designation conditions in the child template. Further, since the designation conditions of the child template are changed in accordance with the designation conditions of the list, the created virtual machine image becomes a virtual machine image adapted to a use environment of the virtual machine rather than the virtual machine image created conventionally.

While the foregoing description relates to the present embodiment, the configuration and the processes of each server described above are not limited to those of the embodiment and various changes and variations may be made without departing from the spirit or scope of the technical scope of the present technology. For example, the package added to a virtual machine image in the embodiment described above, OS setting, driver and so forth are not limited to those described above, and a package applied by a different OS, OS setting, a driver and so forth may be applied. Further, while, in the embodiment described above, for example, the list compared with the child template is stored into the HDD 13 together with the child template, the list may be stored into a different storage region of the HDD 13 or may be stored into an external storage apparatus of the management server 10.

Further, in the embodiment described above, if, from among designation condition of a child template, a designation condition that is different from any of designation conditions of a list is not to be changed automatically (OP110: No), a virtual machine image is created without changing the designation conditions of the child template. However, when a designation condition that is different from any of designation conditions of a list from among designation condition of a child template is not to be changed automatically, a change of a child template by a manual operation of the user of the management server 10 may be accepted. The CPU 11 may control the monitor 20 to display the child template and change the child template in accordance with an operation of the inputting apparatus 30 by the user of the management server 10.

Further, in the embodiment described hereinabove, at least part of the processes described hereinabove may be performed by a processor, other than a CPU, for exclusive use such as a digital signal processor (DSP), a graphics processing unit (GPU), a numerical calculation processor, a vector processor, or an image processor. Alternatively, at least part of the processes described above may be performed by an integrated circuit (IC) or some other digital processor. Further, at least part of the components described hereinabove may include an analog circuit. The integrated circuit includes a large-scale integration (LSI), an application specific integrated circuit (ASIC), and a programmable logic device (PLD). The PLD includes, for example, a field-programmable gate array (FPGA). The components described hereinabove may be a combination of a processor and an integrated circuit. The combination is called, for example, microcontroller (MCU), system-on-a-chip (SoC), system LSI, or chip set.

<Computer-Readable Recording Medium>

A program for causing a computer or some other machine or apparatus (hereinafter referred to as computer or the like) to implement a management tool, an OS and so forth for performing setting of the server described hereinabove may be recorded on a recording medium readable by a computer or the like. By reading the program of the recording medium into a computer or the like and causing the computer or the like to execute the program, functions of the program may be provided.

The recording medium readable by a computer or the like here signifies a recording medium that accumulates information such as data or a program by an electrical, magnetic, optical, mechanical, or chemical action and from which the accumulated information may be read by a computer or the like. As a recording medium that is removable from a computer or the like from among such recording media as list above, there are a flexible disk, a magneto-optical disk, a compact disc read-only memory (CD-ROM), a CD-recordable (R)/rewritable (RW), a digital versatile disc (DVD), a blue ray disk, a digital audio tape (DAT), an 8-mm tape, a memory card such as a flash memory and so forth. Meanwhile, as a recording medium fixed to a computer or the like, there are a hard disk, a ROM and so forth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    a memory configured to store a parent template including a plurality of designation conditions applicable to at least one virtual machine, the plurality of designation conditions including first designation conditions and second designation conditions;
    a processor configured to create a child template for creating a virtual machine image to operate on a virtual machine, the child template being based on the parent template and including at least one designation condition;

compare the at least one designation condition of the child template to the plurality of designation conditions stored in the memory before operation of the child template to create the virtual machine; and display a result of the comparison.

2. The information processing apparatus according to claim 1, wherein the processor is further configured to determine an abnormality of the child template based on the result of the comparison.

3. The information processing apparatus according to claim 1, wherein the first designation conditions are necessary designation conditions and the second designation conditions are non-necessary designation conditions.

4. The information processing apparatus according to claim 1, wherein the result of the comparison indicates whether a designation condition of the child template is unnecessary for the virtual machine image.

5. The information processing apparatus according to claim 4, wherein the result of the comparison indicates whether a designation condition of the child template is necessary condition for operation of the virtual machine to be created from the virtual machine image.

6. The information processing apparatus according to claim 1, wherein the result of the comparison indicates whether a designation condition of the child template is necessary condition for operation of the virtual machine to be created from the virtual machine image.

7. The information processing apparatus according to claim 1, wherein the result of the comparison is indicative of a difference between the at least one designation condition of the child template and the plurality of designation conditions stored in the memory.

8. The information processing apparatus according to claim 7, further comprising:

a monitor on which the result of the comparison is displayed; and an input device to receive input from a user.

9. The information processing apparatus according to claim 8, wherein the processor is further configured to correct the child template based on the input from the user.

10. The information processing apparatus according to claim 1, wherein the processor is further configured to correct the child template based on the result of the comparison.

11. The information processing apparatus according to claim 10, wherein the processor is further configured to create the virtual machine image based on the corrected child template.

12. A control method for an information processing apparatus, the control method comprising:

storing a parent template in a memory by a processor, the parent template including a plurality of designation conditions applicable to at least one virtual machine, the plurality of designation conditions including first designation conditions and second designation conditions;

creating a child template for creating a virtual machine image to operate on a virtual machine, the child template being based on the parent template and including at least one designation condition;

comparing the at least one designation condition of the child template to the plurality of designation conditions stored in the memory before operation of the child template to create the virtual machine; and displaying a result of the comparison.

13. The control method according to claim 12, wherein the result of the comparison is indicative of a difference between the at least one designation condition of the child template and the plurality of designation conditions stored in the memory.

14. A non-transitory computer-readable medium storing a program which, when executed by a computer, causes the computer to perform a process comprising:

storing a parent template in a memory, the parent template including a plurality of designation conditions applicable to at least one virtual machine, the plurality of designation conditions including first designation conditions and second designation conditions;

creating a child template for creating a virtual machine image to operate on a virtual machine, the child template being based on the parent template and including at least one designation condition;

comparing the at least one designation condition of the child template to the plurality of designation conditions stored in the memory before operation of the child template to create the virtual machine; and displaying a result of the comparison.

15. The non-transitory computer-readable medium according to claim 14, wherein the result of the comparison is indicative of a difference between the at least one designation condition of the child template and the plurality of designation conditions stored in the memory.

* * * * *